(12) United States Patent
Wang et al.

(10) Patent No.: US 8,900,650 B1
(45) Date of Patent: Dec. 2, 2014

(54) LOW-SODIUM SALT COMPOSITIONS

(71) Applicants: Ya-Jane Wang, Fayetteville, AR (US); Sakharam K. Patil, Munster, IN (US)

(72) Inventors: Ya-Jane Wang, Fayetteville, AR (US); Sakharam K. Patil, Munster, IN (US)

( * ) Notice: Subject to any disclaimer, the term of this patent is extended or adjusted under 35 U.S.C. 154(b) by 0 days.

(21) Appl. No.: 13/858,917

(22) Filed: Apr. 8, 2013

Related U.S. Application Data

(63) Continuation-in-part of application No. 12/879,489, filed on Sep. 10, 2010, now abandoned.

(60) Provisional application No. 61/397,198, filed on Jun. 9, 2010, provisional application No. 61/340,448, filed on Mar. 18, 2010.

(51) Int. Cl.
A23L 1/237 (2006.01)

(52) U.S. Cl.
CPC ............ *A23L 1/237* (2013.01); *Y10S 426/804* (2013.01)
USPC ............ 426/649; 426/74; 426/514; 426/573; 426/601; 426/634; 426/656; 426/658; 426/804

(58) Field of Classification Search
CPC .... A23B 5/035; A23L 1/304; A23V 2002/00; A23V 2250/1582; A23V 2250/1612; A23V 2300/10; A23W 2200/12
USPC ........... 426/74, 649, 656, 573, 634, 658, 601, 426/804, 514
See application file for complete search history.

(56) References Cited

U.S. PATENT DOCUMENTS

| 4,107,346 | A | * | 8/1978 | Kravitz ..................... 426/648 |
| 4,556,566 | A | | 12/1985 | Bell |
| 5,098,723 | A | | 3/1992 | DuBois |
| 5,098,724 | A | | 3/1992 | DuBois |
| 6,156,247 | A | | 12/2000 | Moschini et al. |
| 2008/0003339 | A1 | | 1/2008 | Johnson et al. |

FOREIGN PATENT DOCUMENTS

| CA | 1147653 | 12/1979 |
| WO | 9115430 | 10/1991 |
| WO | 2009/133409 | 1/2009 |

* cited by examiner

*Primary Examiner* — Helen F Heggestad
(74) *Attorney, Agent, or Firm* — Underwood & Associates, LLC

(57) ABSTRACT

A low-sodium salt composition includes a carrier particle having disposed thereon a plurality of salt crystallites of an average size of less than about 20 microns. The low-sodium salt compositions are useful as salt-alternative products that impart a salty taste with less sodium content than an equivalent volume of sodium chloride by itself.

20 Claims, 3 Drawing Sheets

LOW-SODIUM SALT COMPOSITIONS

CROSS REFERENCE TO RELATED APPLICATIONS

This continuation-in-part application claims priority to and the benefit of U.S. Provisional Patent Application No. 61/397,198, filed on Jun. 9, 2010, U.S. Application No. 61/340,448, filed on Mar. 18, 2010, and U.S. application Ser. No. 12/879,489, now abandoned, filed on Sep. 10, 2010. The entire contents of each identified application are incorporated by reference in their entirety as if fully set forth herein.

TECHNICAL FIELD

This disclosure relates to food ingredients. In particular, this disclosure relates to food additives and ingredients that provide a low-sodium alternative to salt, e.g., sodium chloride, or "table salt". A preferred embodiment of this technology provides small—e.g., tens of microns to submicron-sized salt particles adhered to a bulk carrier. The resulting product provides a desired salt flavor using a reduced amount of sodium chloride as compared to conventional table salt. This disclosure also relates to methods for making low-sodium salt alternatives.

BACKGROUND

Table salt (sodium chloride) provides a taste that humans and other animals generally enjoy. Too much sodium, however, is known to cause certain adverse health effects such as high blood pressure and heart disease. Salt is a common ingredient used in food preparation and is also used as a condiment for finished foods such as cooked meats, vegetables, and snacks, e.g., popcorn. Processed and "fast food" items often contain high levels of salt to provide a desirable taste to the consumer; however, the short term benefit of so-called convenience foods can come with long-term, increased risk of heart attack or stroke. While the human body may require a small amount of salt for electrolyte balance and other physiological processes, in many cases people ingest sodium at levels that can be deleterious to their health.

SUMMARY

In general, according to one embodiment, a low-sodium salt composition is described. The salt composition can be used in cooking and consumed as an alternative to pure sodium chloride ("table salt").

In one embodiment, a low-sodium salt composition includes small particles of sodium chloride adhered to a carrier particle. The particles of sodium chloride can be on the order of tens of microns to sub-micron in size, e.g., in diameter, thus providing a higher surface area-to-volume ratio as compared to conventional table salt crystals. In some embodiments, the small sodium chloride particles are adhered to edible (consumable) carrier particles. In certain embodiments, carrier particles can include carbohydrates and carbohydrate derivatives, yeasts, and proteins, e.g., hydrolyzed proteins, among others.

In one general aspect, a method of making a low-sodium salt composition is provided. The method includes growing salt particles to a size of less than about 20 microns on a carrier, wherein the salt particles have a surface-to-volume ratio, to form an edible, low-sodium salt alternative product having less sodium per unit volume than an equivalent unit volume of sodium chloride.

In one embodiment of the method, the unit volume of sodium chloride and the unit volume of the salt alternative product produce an approximately equivalent salt taste. In one embodiment of the method, the carrier is a bulking agent, carbohydrate or its derivative, starch, maltodextrin, hydrocolloid, protein, protein derivative, yeast extract, flavor enhancer, lipid, mineral, or salt. In one embodiment of the method, the protein derivative is a protein derived from soy, wheat, or whey. In one embodiment of the method, the carbohydrate or its derivative is one or more of maltodextrin, starch, pre-gelatinized starch, modified starch, pyrodextrin, gum, cereal flour, or tuber flour. In one embodiment of the method, the salt(s) is (are) a salt of sodium, chloride, potassium, or sulfate ions. In one embodiment of the method, the salt is one or more of sodium chloride, potassium chloride, magnesium chloride, ammonium chloride, or magnesium sulfate. In one embodiment of the method, the surface area-to-volume ratio is greater than about 1.256 $mm^2$ to about 4.188 $mm^3$.

In another general aspect, a method for reducing an intake amount of a consumable food while providing a substantial equivalent of the food's flavor is provided. The method includes growing crystals or particles of a consumable food to a sub-micron size on the surface of a non-toxic carrier particle during a drying process to form a food-carrier product, wherein a volume equivalent of the consumable food and the food-carrier product each provide a substantial equivalent of the consumable food's flavor intensity.

In one embodiment of the method, the drying process is a freeze drying, spray drying, spray cooking, or roll drying process. In one embodiment of the method, the food is a salt or a sugar. In one embodiment of the method, the salt is a salt of sodium, chloride, potassium, or sulfate ion. In one embodiment of the method, the salt is sodium chloride, potassium chloride, magnesium chloride, ammonium chloride, or magnesium sulfate. In one embodiment of the method, the carrier particle is a bulking agent, carbohydrate or its derivative, hydrocolloid, protein, protein derivative, yeast extract, flavor enhancer, lipid, mineral, or salt. In one embodiment of the method, the food-carrier product comprises two or more different types of carrier particles. In one embodiment of the method, the carbohydrate or its derivative is one or more of maltodextrin, starch, pre-gelatinized starch, modified starch, pyrodextrin, gum, cereal flour, or tuber flour.

In yet another general aspect, a salt substitute composition is provided. The composition includes salt crystals or salt particles of a size less than about fifty microns in diameter adhered to the surface of an edible carrier particle. In one embodiment, the composition further includes salt crystals or salt particles grown on the surface of the carrier particle during a drying process. In one embodiment, the drying process is a freeze drying, spray drying, spray cooking, or roll drying process. In one embodiment of the composition, the edible carrier is a bulking agent, carbohydrate or its derivative, maltodextrin, starch, pre-gelatinized starch, modified starch, pyrodextrin, gum, cereal flour, tuber flour, protein, or protein derivative, yeast extract, flavor enhancer, lipid, mineral, or salt. In one embodiment of the composition, the protein is a protein isolate of a dairy product, soya, wheat, or whey. In one embodiment, the salt crystals or salt particles are of an average size less than about 500 nanometers in diameter. In one embodiment, the composition has a bulk density between about 0.35 g/cc and about 0.65 g/cc.

In yet another general aspect, a salt substitute product is formed by a process that includes mixing an aqueous salt solution and a carrier in a proportion to form a slurry of select density, exposing the slurry to a drying process that generates salt crystal nuclei on the surface of the carrier, and controlling drying parameters to limit the growth of the nuclei into salt crystals having a size of less than about 50 µm in diameter.

In one embodiment, drying includes spray drying, spray cooking, or roll drying. In one embodiment, drying includes spray drying, and controlling drying parameters includes controlling the inlet temperature, pump speed, air flow, and compressor pressure of the spray dryer to achieve salt crystal growth of a selected size.

In yet another general aspect, a salt substitute product with controllable salt intensity flavor is provided. The product includes a salt-carrier product including salt particles of an average size less than about 50 µm adhered to the surface of an edible, non-salt carrier. The salt intensity flavor of the salt-carrier product is dependent on the average size of the salt particles adhered to said non-salt carrier, and the intensity of the salt taste increases as the average size of the salt particles decreases.

In yet another general aspect, a method is provided. The method includes spray drying a slurry composed of an aqueous salt solution and a carrier particle to produce a salt-carrier product having size salt crystals less than about fifty microns attached to the surface of said carrier particle.

In one embodiment of the method, the slurry includes from about 25 weight percent to about 75 weight percent of salt and from about 25 weight percent to about 75 weight percent carrier particle material. In one embodiment of the method, spray drying includes using an inlet temperature of about 150° C. to about 210° C., a pump speed from about 425 mL/hour to about 525 mL/hour, and a compressor pressure from about 0.8 bar to about 1.4 bar.

Certain advantages of the low-sodium compositions described herein include, among others: the ability to provide a desired level of salty flavor while delivering a minimum amount of sodium chloride to the body of the consumer. Another advantage includes the ability to adjust the level of salty flavor, as experienced by the consumer, by adjusting the mean size of the salt particles and/or the composition of the salt(s), e.g., NaCl, KCl, $MgCl_2$, $NH_4Cl$, etc., and mixtures thereof, adhered to the carrier. Yet another advantage includes a method for making ultra-small salt particles without creating hazardous dust, which can occur when grinding salts according to customary commercial practices.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. The materials, methods, and examples are illustrative only and not intended to be limiting. In case of conflict with terms used in the art, the present specification, including definitions, will control.

The details of one or more embodiments are set forth in the accompanying drawings and the description below. Other features, objects, and advantages will be apparent from the drawings and detailed description, and from the claims.

DESCRIPTION OF DRAWINGS

The present embodiments are illustrated by way of example and not limitations in the figures of the accompanying drawings in which.

DETAILED DESCRIPTION OF ILLUSTRATIVE EMBODIMENTS

Figure 1:
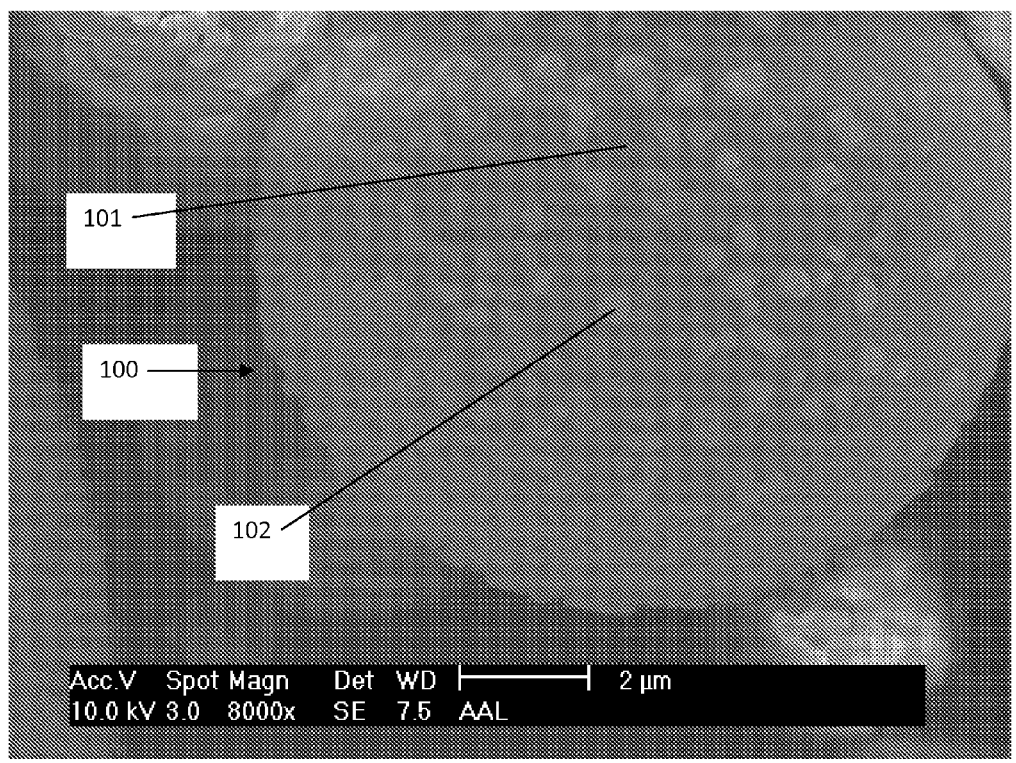
FIG. 1 is a scanning electron micrograph (SEM) of a salt-carrier product.

For table-top or surface (sprinkle-on) applications, most commercially available salt is not immediately soluble in saliva because of its high density and relatively large particle size. When these particles are sprinkled on foods for immediate consumption or during further processing, they provide low intensity, long lasting, spotty salty taste. Most prepared foods are only briefly chewed and swallowed; thus, salt is sometimes added in a relatively high concentration to compensate for incomplete dissolution and the short mouth residence time. As a result, a consumer may ingest salt that is still in granule form and thereby consume far greater quantities of sodium than necessary to achieve a desired "salty" taste.

In general, a desired level of salty flavor can be achieved, while reducing sodium consumption, by providing small consumable salt particles having a large surface area-to-volume ratio. In general, the surface area-to-volume ratio of a particle increases as the size of the particle decreases. Thus, in one aspect, small salt particles provide increased interaction with saliva and sensory physiology in the mouth, e.g., tongue, cheeks, gums, etc., which can lead to an increased sensation of a salty taste. Because more of the salt particle surface is exposed to saliva, the dissolution rate of salt particles is greater as compared to regular, commercial-grade salt particles that one may find, e.g., at a restaurant. Because the residence time of food is relatively short in the mouth, increasing the dissolution rate of salt particles can have a pronounced effect on the sensation of salty taste.

As used herein, the phrases "nanometer- to micron-sized" or "nanometer- to micron-scale" and similar phrases carry their ordinary meaning, that is, they refer to objects having at least one dimension of nanometer or micron scale. Preferably, the salt particles described herein have a diameter between about 100 nm and about 50 microns, e.g., 100 nm, 200 nm, 300 nm, 400 nm, 500 nm, 600 nm, 700 nm, 800 nm, 900 nm, 1 µm, 1.1 µm, 1.2 µm, 1.3 µm, 1.4 µm, 1.5 µm, 1.6 µm, 1.7 µm, 1.8 µm, 1.9 µm, 2.0 µm, 2.1 µm, 2.2 µm, 2.3 µm, 2.4 µm, 2.5 µm, 2.6 µm, 2.7 µm, 2.8 µm, 2.9 µm, 3.0 µm, 3.5 µm, 4.0 µm, 4.5 µm, 5.0 µm, 10 µm, 15 µm, 20 µm, 25 µm, 30 µm, 35 µm, 40 µm, 45 µm, 50 µm. More preferably, the salt particles described herein have a diameter between about 200 nanometers and about 50 microns. "Salt particles" can refer to a specific size, e.g., a narrow size distribution of particles, or a collection of particles of different sizes, e.g., a mean size for a population of salt particles.

In one embodiment, nanometer- to micron-sized salt particles are provided for direct application on prepared foods or in preparation of foods. In this and other embodiments, other ingredients can be added to the salt particles to achieve certain storage or use parameters, e.g., bulk density, flow, anti-caking, hydrophobicity, and other parameters. In some embodiments, a coagulating or wetting agent may be used to reduce the likelihood of producing an excess amount of dust when salt particles are applied to, or used in the preparation of foods.

In general, nanometer- to micron-sized salt particles can be adhered to a carrier to deliver the ultra-small salt particles to the consumer's mouth. The term "adhered" as used herein carries its ordinary meaning: to be joined or united, or attached. The processes involved in adhering salt particles to carriers can include chemical ionic and covalent bonding, surface tension, adhesion, and any other physical process that joins the two entities.

Carriers can include, without limitation, bulking agents, cereal and tuber starches, maltodextrins, cereal and tuber flours, hydrocolloids, proteins, protein powders, including those from any plant or animal source, including, but not limited to cereals, tuber, dairy and whey powders; flavors, and seasonings, among others. Proteins can be any protein source from plant or animal, including dairy, meat, corn, etc. Carriers can vary in size and shape and can be processed from their original form (e.g., protein powders can be further refined or milled to a desired size) to provide a desired functionality, such as bulk flow or bulk density. In some embodiments, utilizing a carrier to deliver salt particles can provide certain packing, storage, and use benefits. For example, a carrier can be chosen to provide a desired bulk density for a particular salt-carrier product. In another example, a carrier may be chosen for its bulk flow characteristics in large-scale foods processing, or for its hydrophobic or hygroscopic properties. Hereinafter, a "salt-carrier product" refers to nanometer- or micron-scale salt particles adhered to a carrier.

In general, salt particles can be adhered to the surface of a carrier. The degree of salt coverage on the particle can be varied to produce various taste effects, including adjusting the intensity of a salty flavor. In addition, the bulk density of the salt, e.g., sodium chloride, in a salt-carrier product can be adjusted by controlling the salt coverage on the particle.

In general, the salt-carrier products described herein can be agglomerated to provide desirable properties related to use, storage, handling, and other considerations. For example, to reduce dust, salt-carrier products can include wetting agents or other additives to promote agglomeration of particles. Other additives can be used for obtaining a desired bulk density, product flow, antimicrobial, or other material handling parameter.

A salt-carrier product can be made, according to one of many methods, by carrying out the following steps, which need not necessarily be performed in the order presented. First, a salt-carrier slurry is prepared by adding a selected carrier (e.g., a protein powder) to an aqueous salt solution. The concentration of salt in the salt solution can be adjusted to provide a desired coverage of salt on the resulting salt-carrier product. The salt solution can include single salts (e.g., sodium chloride) or a mixture of salts (e.g., sodium chloride, potassium chloride, ammonium chloride, etc.). The carrier can be any bulking agent, e.g., a powdered bulking agent, including but not limited to proteins, carbohydrates or their derivative(s) (maltodextrin, pre-gelatinized starch, gums, cereal flours and the like), hydrocolloids, hydrolyzed proteins, yeast extracts, and flavorings. In some embodiments, a combination of different types of carriers can be used, e.g., a combination of a carbohydrate, a starch, and potassium salt can be used. The proportion of carrier to salt can be chosen to obtain a desired working density or other characteristic of the salt-carrier product. The salt-carrier mixture can then be mixed until homogeneous.

The salt-carrier mixture can then be subjected to a process to drive off (evaporate) water. In general, it can be advantageous to drive off water quickly, so as to reduce the growth time of salt nuclei that form on the surface of the carrier during the drying process. Exemplary processes for removing water from the carrier-slurry mixture include spray drying, spray cooking, freeze drying, and drum drying, among others.

In general, characteristics of the salt-carrier product such as the bulk density and the salt particle size can be varied by controlling the drying conditions. In some embodiments it can be advantageous to minimize the sodium bulk density as much as possible to reduce the sodium content of the finished product. In certain embodiments, it is possible to achieve bulk densities between 0.40 grams/cubic centimeter (g/cc) and 0.70 g/cc, e.g., 0.40 g/cc, 0.43 g/cc, 0.46 g/cc, 0.49 g/cc, 0.52 g/cc, 0.55 g/cc, 0.58 g/cc, 0.61 g/cc, 0.64 g/cc, 0.67 g/cc, 0.70 g/cc.

In one general aspect, a method for controlling the salt taste intensity of a salt-carrier product is provided. Without wishing to be bound by theory, a general relationship between the size—and therefore the surface area, which is inversely proportional to the size—and the intensity of the salty flavor in a salt-carrier product can exist. In general, as the size of adhered salt particles decrease, more of the salt particles are exposed to the mouth physiology, and thus the intensity of the salt flavor can increase from that interaction and the corresponding increased dissolution rate. Thus, the amount of salt flavor intensity provided by a salt-carrier product can be controlled by preparing products having different sized salt particles, e.g., an average diameter of 100 nm, 200 nm, 300 nm, 400 nm, 500 nm, 1 µm, 2 µm, 5 µm, 20 µm, 50 µm, etc.

In one approach, the average size of the salt particles can be controlled by adjusting parameters during the drying process, e.g., a spray-drying process, including one or more of (not by way of limitation): the ratio of salt-to-carrier in the slurry, and spray drier parameters, including one or more of the inlet temperature, pump speed, air flow, and compressor pressure. For example, in one embodiment, the slurry comprises from about 25 weight percent to about 75 weight percent of salt and from about 25 weight percent to about 75 weight percent carrier particle material. In one embodiment, the spray drying process comprises using an inlet temperature of about 150° C. to about 210° C., a pump speed from about 425 mL/hour to about 525 mL/hour, and a compressor pressure from about 0.8 bar to about 1.4 bar. Other non-limiting approaches are shown in the examples that follow; however, it will be understood that various other means can be used to achieve similar results.

EXAMPLES

Example 1

Referring now to FIG. 1, a scanning electron micrograph (SEM) of a salt-carrier product 100 is shown. The micrograph of the salt-carrier product 100 shown in FIG. 1 was prepared by spray drying 25 weight percent NaCl (25% NaCl by weight based on solvent weight) and 75 weight percent Maltrin M100 (75% by weight Maltrin M100 based on solvent weight, Grain Processing Corp., Muscatine, Iowa) in a 50% solid solution. The solution was mechanically mixed and subjected to sonification prior to spray-drying. A GEA Niro spray dryer (Columbia, Md.) was used with an inlet temperature of 180° C., a pump speed of 475 mL/hour, an air flow of 68 m$^3$/hour and a compressor pressure of 1.1 bar. The resulting salt composition had a packed bulk density of 0.48 g/cc with a 200 nm average salt particle diameter. The carrier 101 and an exemplary salt grain 102 are shown.

Example 2

Figure 2:
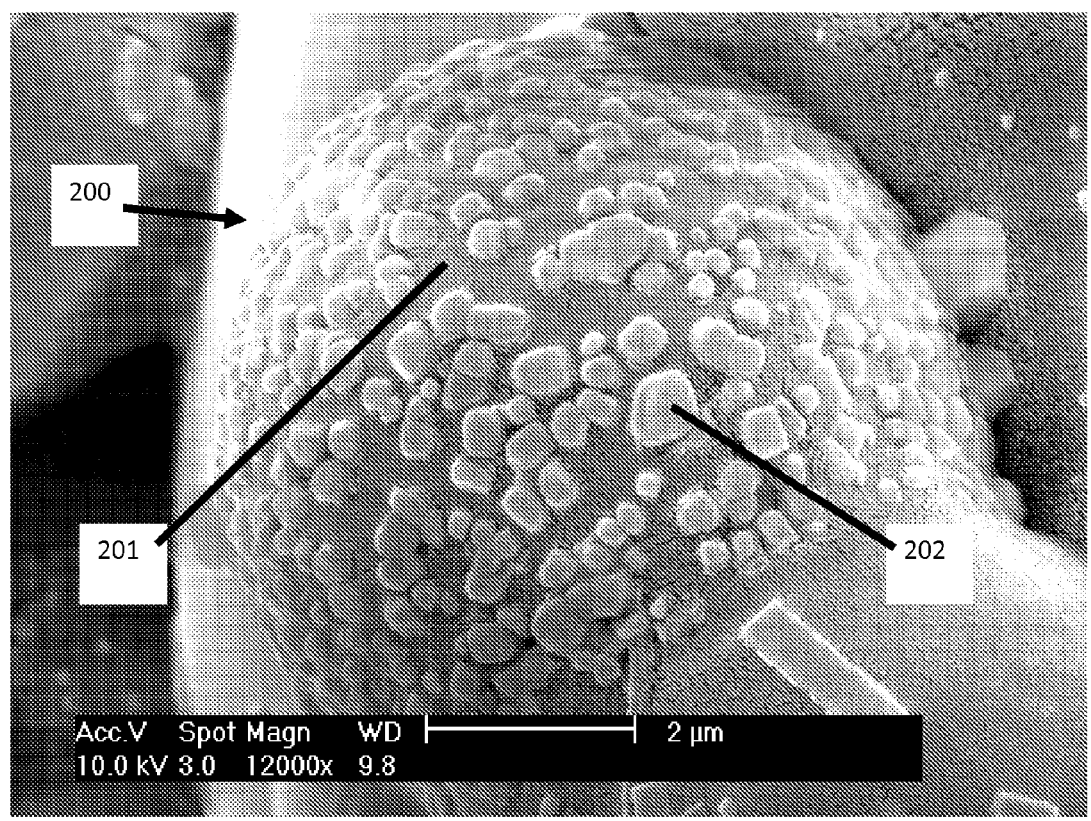
FIG. 2 is a scanning electron micrograph (SEM) of a salt-carrier product.

Referring now to FIG. 2, a SEM of a salt-carrier product 200 is shown. The micrograph of the salt-carrier product 200 shown in FIG. 2 was prepared by spray drying 50 weight percent NaCl (33% NaCl by weight based on solvent weight) and 50 weight percent Maltrin M100 (33% by weight Maltrin M100 based on solvent weight, Grain Processing Corp., Muscatine, Iowa) as a carrier 201 in a 40% solid solution. A GEA Niro spray dryer was used with an inlet temperature of 180° C., a pump speed of 475 mL/hour, an air flow of 68 m³/hour and a compressor pressure of 1.1 bar. The resulting salt-carrier product had a packed bulk density of 0.58 g/cc with 300 nm average salt particle diameter. An exemplary salt particle 202 is shown.

Example 3

Figure 3:
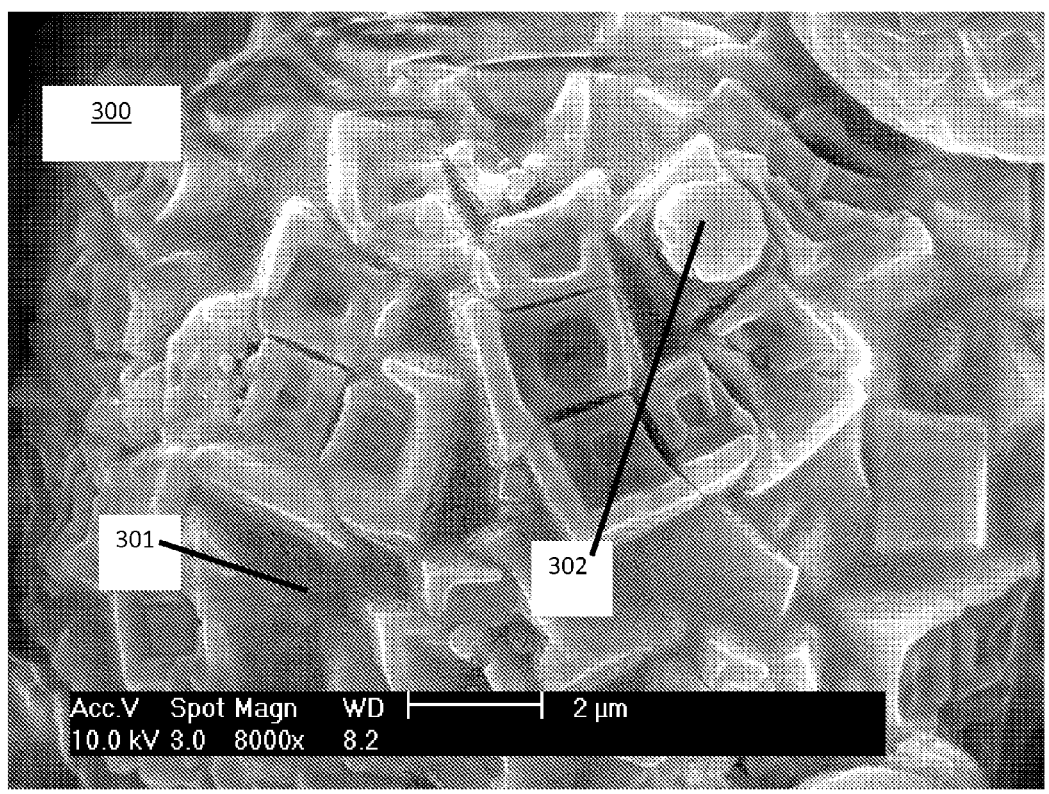
FIG. 3 is a scanning electron micrograph (SEM) of a salt-carrier product.

Referring now to FIG. 3, a SEM of a salt-carrier product 300 is shown. The micrograph of the salt-carrier product shown in FIG. 3 was prepared by spray drying 75 weight percent NaCl (50% by weight NaCl based on solvent weight) and 25 weight percent Maltrin M100 (17% by weight Maltrin M100 based on solvent weight, Grain Processing Corp., Muscatine, Iowa) in a 40% solid solution. A GEA Niro spray dryer was used with an inlet temperature of 180° C., a pump speed of 475 mL/hour, an air flow of 68 m³/hour and a compressor pressure of 1.1 bar. The resulting salt composition has a packed bulk density of 0.60 g/cc with 2 μm average salt particle diameter. An exemplary salt particle 302 is shown on the surface of the Maltrin M100 carrier 301.

Example 4

A salt-carrier product was prepared by spray drying 50 weight percent NaCl (33% by weight NaCl based on solvent weight) and 50 weight percent gum arabic (33% by weight gum arabic based on solvent weight, TIC Gums, White Marsh, Md.) in a 40% solid solution (bulk density 0.66 g/cc) or by spray drying a 75 weight percent NaCl (40% by weight NaCl based on solvent weight) and 25 weight percent gum arabic (13% by weight gum arabic based on solvent) in a 35% solid solution. The resulting salt-carrier product had a bulk density 0.43 g/cc.

Example 5

A salt-carrier product was prepared by spray drying 50 weight percent NaCl (22% NaCl based on solvent weight) and 50 weight percent modified common corn starch (22% by weight common corn starch based on solvent weight, Cargill Set 05034, Cargill Inc.) in a 30% solid solution (bulk density 0.56 g/cc) or by spray drying a 75 weight percent NaCl (32% by weight NaCl based on solvent weight) and 25 weight percent Cargill Set 05034 (10% by weight Cargill Set 05034 based on solvent weight) in a 30% solid solution (bulk density 0.48 g/cc).

A number of illustrative embodiments have been described. Nevertheless, it will be understood that various modifications may be made without departing from the spirit and scope of the inventive concepts presented herein. For example, suitable carriers can include any material capable of providing a nucleation site for salt crystals. Examples include non-organic materials such as certain plastics and synthetic fillers known in the art. "Salt" can be any type of salt, e.g., potassium chloride or a combination of salts. In certain preferred embodiments, "salt" refers to salts of sodium, chloride, potassium or sulfate ions. While the context of this disclosure focuses on providing low-sodium products for foodstuffs, the disclosed technology can be used for other purposes, including methods for introducing salts into living systems for medical or veterinary applications. In certain embodiments, the methods and products described herein can be used in applications where rapid introduction of sodium may be advantageous, e.g., in certain medical applications. Salts may include certain additives, e.g., minerals or other chemical elements; in some cases, the additives may provide certain health benefits.

In general, the methods provided herein can extend to other foods and food additives as well. For example, using similar processes as those described above, sugar particles can be grown on a suitable carrier to provide an analogous sugar-carrier product. Such an embodiment may provide a more intense sugar flavor than can be obtained with commercially-available sugar granules commonly found in restaurants, and may assist in lowering overall sugar intake. Those with certain adverse health conditions, such as diabetes or obesity may find such a sugar-carrier product beneficial to their health.

In general, the salt-carrier products (and their equivalents) described herein may be packaged for retail sale or for bulk shipments. The products described herein may be used for sprinkle-on applications, e.g., used in salt shakers and the like, and in bulk applications such as large-scale food processing. The salt-carrier products described herein may be used as flavorings, tenderizers, flavor enhancers, additives, fillers, and other ingredients generally known to those who prepare and consume foods, e.g., chefs, those in the food preparation industry, and consumers. Accordingly, other embodiments are within the scope of the following claims.

What is claimed is:

1. A method of making a low-sodium, salt alternative composition having less sodium per unit volume than an equivalent unit volume of sodium chloride, comprising:
   providing an aqueous slurry comprising an aqueous solvent and a selected percent by weight of a solids mixture, wherein said solids mixture comprises salt and a carrier medium, and wherein said carrier medium is present in an amount between about 25% by weight and about 75% by weight of said aqueous solvent; and
   exposing said slurry to a drying process to both:
   A) form a carrier particle comprised of said carrier medium; and
   B) form a plurality of salt particles of an average size of less than about 20 microns on the surface of said carrier particle.

2. The method of claim 1, wherein said drying process is spray drying, spray cooking, freeze drying or roll drying.

3. The method of claim 1, wherein said unit volume of sodium chloride and said unit volume of said salt alternative composition produce an approximately equivalent salt taste.

4. The method of claim 1, wherein said carrier medium is a bulking agent, carbohydrate or its derivative, starch, maltodextrin, hydrocolloid, protein, protein derivative, yeast extract, flavor enhancer, or lipid.

5. The method of claim 4, wherein said protein derivative is a protein derived from soy, wheat, or whey.

6. The method of claim 4, wherein said carbohydrate or its derivative is one or more of maltodextrin, starch, pre-gelatinized starch, modified starch, pyrodextrin, gum, cereal flour, or tuber flour.

7. The method of claim 1, wherein said salt is one or more of sodium chloride, potassium chloride, magnesium chloride, ammonium chloride, or magnesium sulfate.

8. The method of claim 1, wherein said drying process comprises spray-drying using a spray drier inlet temperature between about 170° C. and about 190° C., a pump speed between about 450 mL/hour and about 500 mL/hour, an air flow between about 60 m³/hour and about 90 m³/hour and a compressor pressure of between about 1.0 bar and about 1.4 bar.

9. The method of claim 1, wherein said solids mixture comprises salt in an amount between about 25% by weight and about 75% by weight of said aqueous solvent.

10. The method of claim 1, wherein:
said aqueous slurry comprises about 25% by weight sodium chloride and about 75% by weight of said carrier medium based on the weight of said aqueous solvent; and
wherein said salt particles formed on said carrier particle are of an average particle size of about 200 nanometers.

11. The method of claim 1, wherein:
said aqueous slurry comprises about 33% by weight sodium chloride and about 33% by weight of said carrier medium based on the weight of said aqueous solvent; and
wherein said salt particles formed on said carrier particle are of an average particle size of about 300 nanometers.

12. The method of claim 1, wherein:
said aqueous slurry comprises about 50% by weight sodium chloride and about 17% by weight of said carrier medium based on the weight of said aqueous solvent; and
wherein said salt particles formed on said carrier particle are of an average particle size of about 2 microns.

13. A salt substitute product formed by a process comprising:
preparing an aqueous slurry comprising salt and a carrier medium, wherein said carrier medium comprises between about 25% and about 75% by weight of the total dissolved solids in said slurry;
exposing said slurry to a drying process that causes a carrier particle to be formed comprising said carrier medium and also causes a plurality of salt crystal nuclei to form on the surface of said carrier particle; and
controlling drying parameters of said drying process to limit the growth of said salt crystal nuclei into salt crystals having an average size of less than about 20 microns to form said salt substitute product.

14. The product of claim 13, wherein said drying process is a freeze drying, spray drying, spray cooking, or roll drying process.

15. The product of claim 13, wherein said salt is a salt of sodium, chloride, potassium, or sulfate ion.

16. The product of claim 13, wherein said carrier medium is a bulking agent, carbohydrate or its derivative, hydrocolloid, protein, protein derivative, yeast extract, flavor enhancer, lipid, mineral, or salt.

17. The product of claim 13, wherein said carrier media comprises two or more different medium materials.

18. The product of claim 13, wherein said drying process comprises spray drying, and wherein said controlling drying parameters comprises controlling the inlet temperature, pump speed, air flow, and compressor pressure of the spray dryer to limit salt crystal growth to a size of less than about 20 microns.

19. The product of claim 13, wherein the interior portion of said carrier particle is substantially devoid of said salt crystals.

20. A salt-alternative composition, comprising:
an organic carrier particle having a diameter less than about twenty microns formed of an edible, non-toxic material that is capable of being spray-dried from a dissolved state to form said carrier particle; and
a plurality of salt particles having a size dimension less than the diameter of said carrier particle adhered to the outer surface of said carrier particle.

* * * * *